United States Patent [19]

Welstead

[11] Patent Number: 4,479,321
[45] Date of Patent: Oct. 30, 1984

[54] NIGHT FISHING LIGHT

[76] Inventor: Robert F. Welstead, 1003 3rd Ave., Plattsmouth, Nebr. 68048

[21] Appl. No.: 441,612

[22] Filed: Nov. 15, 1982

[51] Int. Cl.³ ............................................. A01K 97/12
[52] U.S. Cl. .......................................... 43/17; 43/17.5
[58] Field of Search ........................... 43/17, 17.1, 17.5

[56] References Cited

U.S. PATENT DOCUMENTS

| | | | |
|---|---|---|---|
| 2,671,209 | 3/1954 | Habib | 43/17 |
| 2,770,907 | 11/1956 | Sharer | 43/17.5 |
| 2,774,168 | 12/1956 | Chute | 43/17 |
| 2,995,853 | 8/1961 | Ohliger | 43/17 |
| 3,882,629 | 5/1975 | Kaye | 43/17 |
| 3,959,911 | 6/1976 | Puckett | 43/17 |
| 4,376,349 | 3/1983 | Yarczower | 43/17.5 |

Primary Examiner—Nicholas P. Godici
Assistant Examiner—Kurt Rowan
Attorney, Agent, or Firm—Zarley, McKee, Thomte, Voorhees & Sease

[57] ABSTRACT

A night fishing signaling device includes an elongated battery housing adapted to be mounted on a fishing rod adjacent the free end opposite the handle. An electrically actuated light source is mounted on the housing and electrically connected to the battery by an electrical circuit which includes a gravity actuated switch operative to make and break the electrical connection between the battery and light source in response to rotational movements of the free end of the fishing rod.

1 Claim, 8 Drawing Figures

NIGHT FISHING LIGHT

BACKGROUND OF THE INVENTION

The present invention is directed generally to a fishing rod mounted signaling device and more particularly to a compact signal unit adapted for mounting at the free end of a fishing rod and being responsive to rotational movement of the free end of the rod for illuminating a light source on the unit.

Many devices have previously been proposed for lighting a lamp in response to the bite of a fish on the line of a fishing rod. Generally, these devices have included some type of battery housing attachable to the fishing rod adjacent the handle. The battery is electrically connected to a light bulb and a trigger switch is imposed between the bulb and battery to illuminate the bulb when the fish strikes the hook.

Problems associated with these types of devices are that the fish line must be offset or otherwise tied onto the trigger to actuate the same, thereby constituting some interference with the normal fishing technique. Furthermore, the size and placement of the housings adjacent the handle often result in further interference. A bulb situated adjacent the handle tends to lack movement which would facilitate detection of the strike. Finally, some of the prior devices are difficult to attach to a fishing rod.

Accordingly, it is a primary object of the present invention to provide an improved signaling device for a fishing rod to indicate a strike on the line.

Another object is to provide an improved signaling device, the sensitivity of which is infinitely adjustable to accommodate varying situations.

Another object is to provide an improved signaling device which does not interfere with normal fishing techniques.

Another specific object of the invention is to provide an improved signaling device which does not contact either the fishing reel or fishing line.

Another object is to provide an improved signaling device which may be quickly and easily installed on and removed from a fishing rod.

Finally, an object of the invention is to provide an improved signaling device which is simple and durable in construction, economical to manufacture and efficient in operation.

SUMMARY OF THE INVENTION

The signaling device of the present invention includes an elongated battery housing adapted to be mounted on a fishing rod adjacent the free end opposite the handle.

An electrically actuated light source is mounted on the housing and electrically connected to the battery by an electrical circuit which includes a gravity actuated switch which is thus operative to make and break the electrical connection in response to rotational movements of the free end of the fishing rod.

The gravity actuated switch is preferably a mercury switch and is adjustable to vary the sensitivity of the device. A rotatable mercury switch is infinitely adjustable so that the switch may be actuated by a slight touch on the forceful strike on the hook or anywhere between these extremes. An external handle affords a visual indication of the position of the mercury switch and a flexible cord fastener enables the device to be quickly and easily installed on and removed from the fishing rod.

The installed signaling device is positioned on the opposite side of the rod as the fishing line and is distantly removed from the handle end of the rod so as to avoid any interference with any desired grip of the rod. When the rod is supported unattended at the water's edge, the placement of the signaling device at the free end of the rod generally results in movement of the device when a fish strikes the line so that the illuminated bulb is far more readily visible because of the imparted motion.

DESCRIPTION OF THE PREFERRED EMBODIMENT

Figure 1:
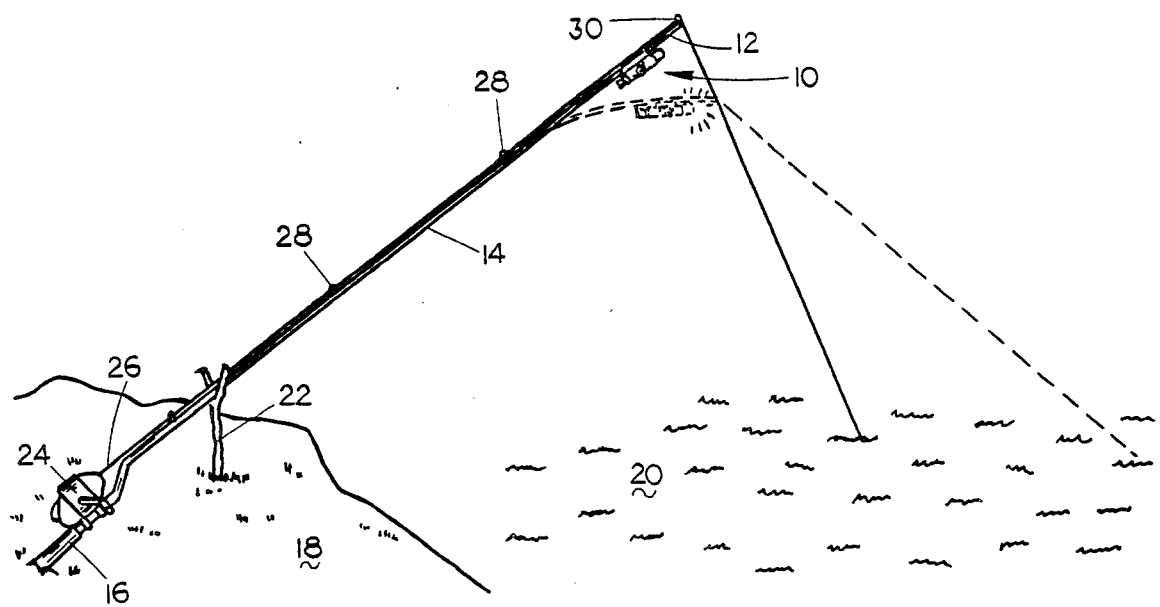
FIG. 1 is a perspective view showing the signaling device in operation on a fishing rod.

The signaling device 10 of the present invention is shown in FIG. 1 installed on the free end 12 of a fishing rod 14 having its opposite handle end 16 resting on the ground 18 adjacent a body of water 20 and with an intermediate portion of the rod resting on a stand 22 so that the rod is inclined upwardly and outwardly toward the water. A conventional reel 24 is mounted on the rod just forwardly of the handle and has a fishing line 26 directed forwardly through the line guides 28 and end guide 30 for connection to a baited hook in the water.

Figure 2:
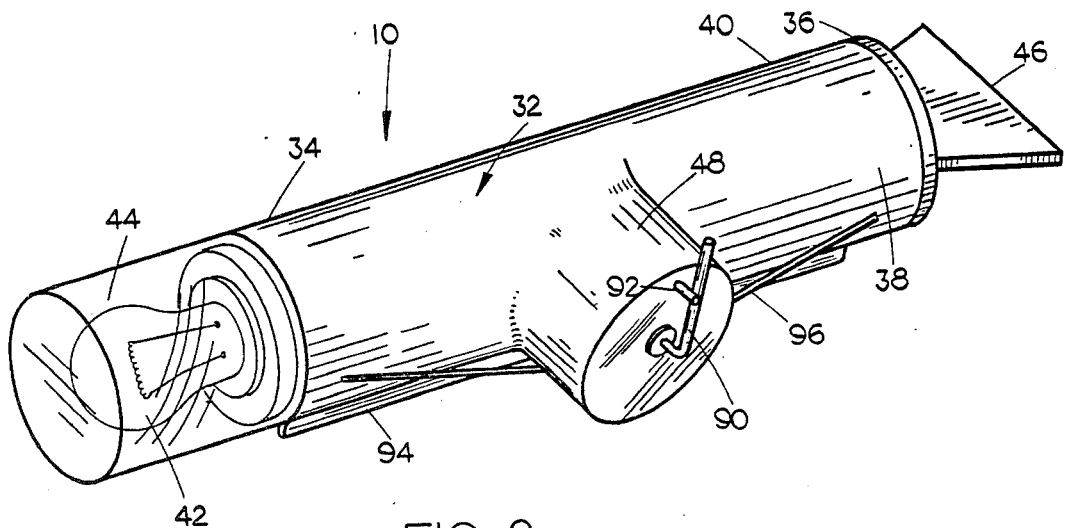
FIG. 2 is an enlarged perspective view of the signaling device.

Referring to FIG. 2, the signaling device 10 includes an elongated tubular housing 32 having a forward end 34, a rearward end 36. A light bulb 42 is supported at the forward end and enclosed within a transparent cap 44. The housing is preferably designed to be substantially filled by a single battery and the rearward end of the housing is closed by an end plug 46. A lateral protrusion 48 on the housing side wall 38 accommodates an internally situated gravity actuated switch for making and breaking the electrical connected between the battery and light bulb 42.

Figure 3:
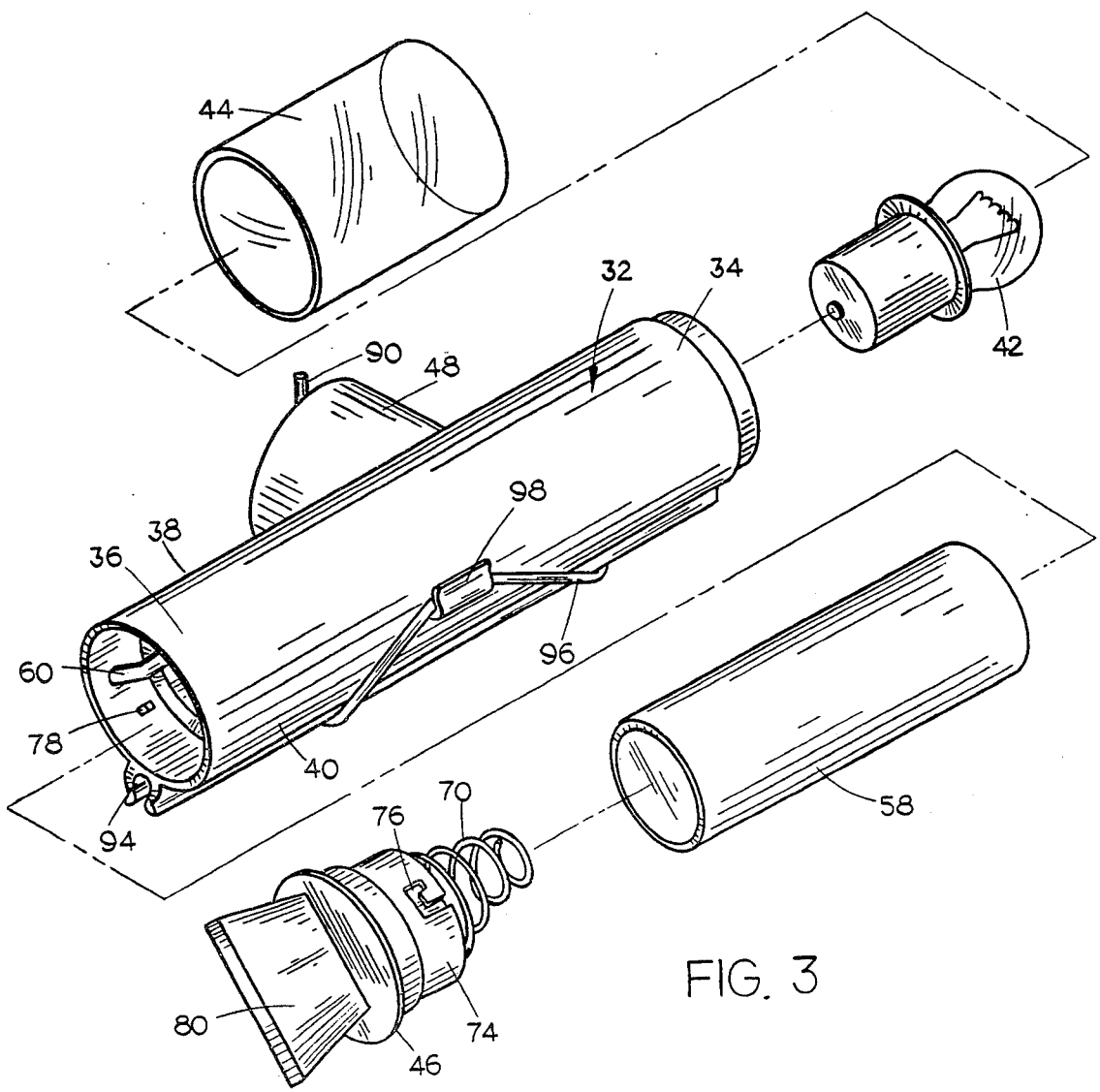
FIG. 3 is an exploded perspective view of the signaling device.
Figure 4:
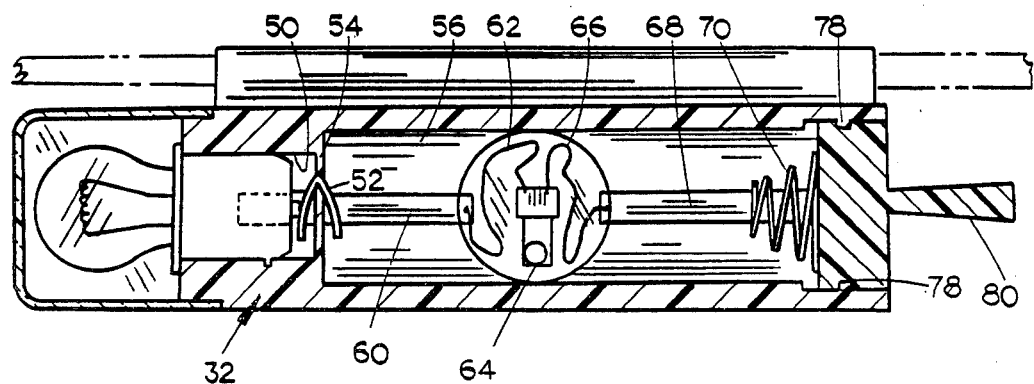
FIG. 4 is a partially sectional side view of the device.

The assembly and structure of the device may be more apparent in FIGS. 3 and 4 wherein it is seen that the light bulb 42 is press-fit within a socket 50. A V-shaped spring contact 52 extends through the bottom wall 54 of socket 50 and into the battery chamber 56 to establish electrical contact between a battery 58 and the light bulb 42. The side wall of the bulb socket 50 is connected to the opposite terminal of the battery by a copper strip 60 having a forward end and engagement with the side wall of socket 50 in the opposite end extended through the battery chamber to the switch enclosure 48. A wire 62 connects strip 60 to one terminal of the mercury switch 64 and another wire 66 connects the opposite terminal of the mercury switch to another copper strip 68 which extends to the rearward end 36 of the housing for electrical contact with the end plug 46 and thereby with the opposite terminal of the battery.

End plug 46 has a forward insert portion 74 which may be slotted as indicated at 76 in FIG. 3 for cooperation with a protrusion 78 to releasably secure the end plug in the housing. Of course, the end plug may be press-fit, threaded or otherwise secured in place, if preferred. A rearwardly extended grip member 80 facilitates insertion and removal of the end cap.

Figure 5:
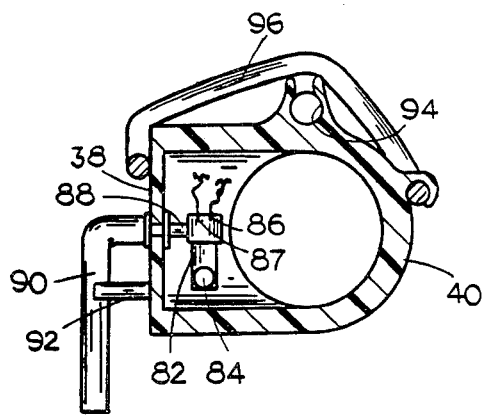
FIG. 5 is a partially sectional end view showing the switch mechanism of the invention.

The mercury switch 64 is shown in FIG. 5 as including a generally cylindrical enclosure 82 which contains the relatively smaller body of mercury 84 and has a pair of electrical contacts 86 and 87 protruding into one end of the enclosure 82. A pivot shaft 88 extends through the housing side wall 38 and is rotatably supported therein. The mercury switch 64 is mounted on the internal end of shaft 88 and a generally L-shaped handle is mounted on the external end of the shaft for manually adjusting the pivoted position of the mercury switch. A stop bar 92 may be provided on the housing side wall to limit rotation of the handle to slightly less than a full 360° rotation.

Figure 6:
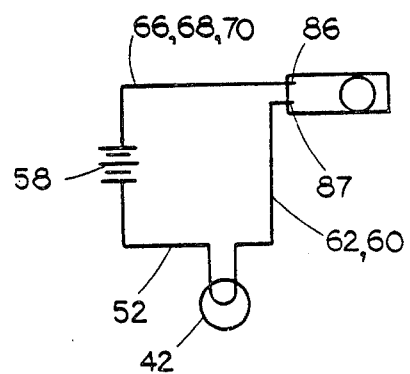
FIG. 6 is an electrical schematic diagram.

An electrical schematic diagram of the circuitry of the invention is shown in FIG. 6 wherein it is seen that the battery 58 is connected to the light bulb 42 by the V-shaped contact 52 and to the mercury switch by the wire 66, copper strip 68 and spring 70. The opposite contact 87 of the mercury switch is connected to the bulb by wire 62 and copper strip 60. Thus the circuit between the battery 58 and bulb 42 is completed only when the body of mercury 84 engages the contacts 86 and 87 to complete the electrical connection therebetween.

Figure 7:
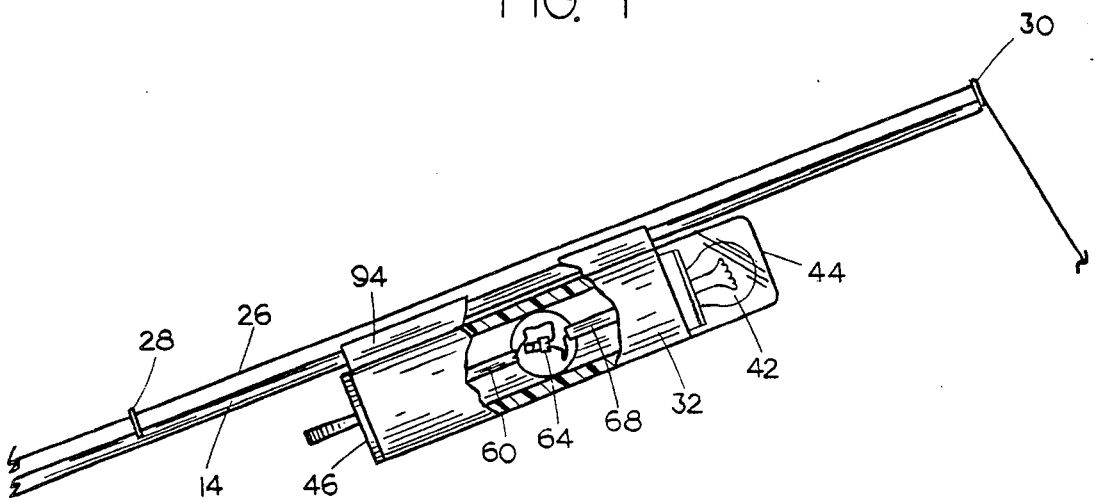
FIG. 7 is a side view of the device with portions broken away to show the mercury switch in an "off" position.

To mount the signaling device on the fishing rod, the housing 32 is provided with a longitudinally extended opensided groove 94 which is of such small dimensions for being snap-fit onto a fishing rod adjacent the free end 12 as indicated in FIG. 7. To further assure that the device is retained on the rod, a flexible cord 96 has its opposite ends connected to side wall 38 so that a medial portion thereof may be extended past groove 94 for engagement with a hook 98 on the opposite side wall 40 as shown in FIGS. 3 and 5.

Figure 8:
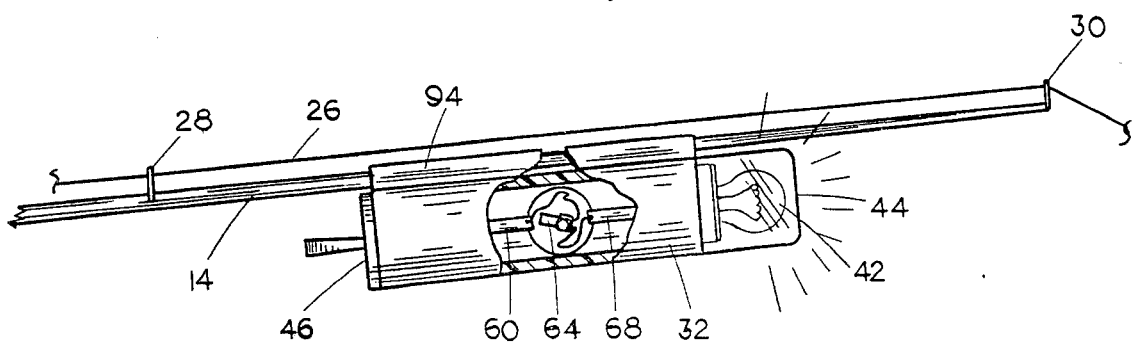
FIG. 8 is a side view similar to FIG. 7 but with the mercury switch in an "on" position.

The operation of the signaling device of the present invention is evident in FIGS. 7 and 8. FIG. 7 shows the device installed on a fishing rod with a non-lit bulb awaiting a fish to strike the line. FIG. 8 shows the bulb illuminated when the free end of the fishing rod is rotated downwardly in response to a fish striking the line, as also illustrated in dotted lines in FIG. 1.

It can be seen in FIG. 7 that the mercury switch is inclined relative to a horizontal plane with the contacts 86 and 87 disposed slightly upwardly and forwardly of the body of mercury 84 at the opposite end of enclosure 82. The pull of a fish on the line rotates the free end of the fishing rod downwardly to the position of FIG. 8 whereupon the mercury 84 slides forwardly to complete the electrical connection between contacts 86 and 87 and illuminate bulb 42. The flexibility of the rod thus imparts a back and forth waving motion to the illuminated bulb to facilitate its detection by a fisherman who may be watching several pulls from a remote location.

The sensitivity of the device is infinitely adjustable by adjusting the rotational position of the mercury switch with handle 90. Generally, one would set the pole in the desired position and then turn the mercury switch in a clockwise direction as viewed in FIG. 7 until the bulb is illuminated. The fisherman then need only back off the handle in a counterclockwise direction to the desired sensitivity. If the handle is backed off only slightly, the device will remain sufficiently sensitive to signal even the bite of a small fish in calm water. Wind and the wave action of rough water will necessitate that the handle be backed off to a further extent so that the movement of the line due to these conditions will not result in the bulb being illuminated.

The simple compact construction of the signaling device adapts it for use on all fishing poles and possibly ice fishing tip-ups as well. Housing with somewhat larger grooves 94 could be provided to accommodate the relatively larger rods used for ocean fishing. Likewise, whereas the device is shown below the rod in FIGS. 1, 7 and 8, this is only to avoid interference with the fishing line 26. The snap-fit of the device onto the rod enables it to be supported above the rod in situations where the line is disposed below the rod such as is generally the case with open face reels. In either event, the device remains free of any interfering contact with the fishing line. The placement of the device adjacent the free end of a fishing rod causes light from the bulb to be reflected by the end guide 30 for increased visibility.

Whereas a preferred embodiment of the invention has been shown and described herein, it will be apparent that many modifications, substitutions and alterations may be made which are within the intended broad scope of the invention. Whereas the mercury switch is the preferred form of the gravity actuated switch, other types such as a mechanical pendulum actuated switch could be operative as well. It is preferable that the housing be of a lightweight material such as plastic and that it be small enough to accommodate only a single AAA battery to minimize its overall weight. The mercury switch handle is preferably retained in any selected position by frictional contact with the housing side wall 38 but something like ratchet stops could be provided to afford positive mechanical locking at selected positions if desired.

Thus there has been shown and described an improved signaling device for night fishing which accomplishes at least all of the stated objects.

I claim:

1. A signaling device for an elongated fishing rod having a handle at one end and an opposite free end, comprising a housing, means for mounting said housing on said rod adjacent the free end thereof for movement therewith, an electrically actuated light source visibly mounted on said housing, said housing being adapted to receive a battery therein and including electric circuit means operative for establishing an electrical connection between said light source and a battery in said housing for illuminating said light source, said electrical circuit including a gravity actuated mercury switch adjustably rotatably mounted on said housing which is operative to make and break said electrical connection in response to rotational movement of said free end of the rod, said gravity actuated switch being adjustably rotatably mounted on said housing, thereby to vary the degree of rotational movement of the rod which is operative to make said electrical connection, a handle mounted externally of said housing and connected to said mercury switch for rotational movement therewith whereby said mercury switch may be rotatably adjusted by said handle, said housing comprising an elongated cylindrical body having forward and rearward ends and opposite side walls, said light source being replaceably mounted adjacent the forward end, and a pivot shaft extended through one side wall, said mercury switch and handle both being connected to said pivot shaft and extended generally perpendicularly therefrom.

* * * * *